United States Patent [19]

Nagai et al.

[11] Patent Number: 5,060,208
[45] Date of Patent: Oct. 22, 1991

[54] MAGNETOOPTICAL RECORDING METHOD AND APPARATUS UTILIZING SHIFT ADJUSTMENT

[75] Inventors: Nobuyuki Nagai, Hadano; Takeshi Maeda, Kokubunji; Atsushi Saito, Ichikawa; Takeshi Nakao, Sagamihara; Hitoshi Watanabe, Ibaraki, all of Japan

[73] Assignees: Hitachi, Ltd., Tokyo; Hitachi Maxwell, Osaka, both of Japan

[21] Appl. No.: 288,124

[22] Filed: Dec. 22, 1988

[30] Foreign Application Priority Data

Dec. 25, 1987 [JP] Japan .................. 62-326898

[51] Int. Cl.⁵ .............. G11B 13/04; G11B 11/12
[52] U.S. Cl. .................. 369/013; 369/124; 369/54; 369/58
[58] Field of Search .......... 369/13, 124, 54, 58; 360/59, 114

[56] References Cited

U.S. PATENT DOCUMENTS

| | | | |
|---|---|---|---|
| 4,449,154 | 5/1984 | Ohnishi et al. | 360/51 |
| 4,495,530 | 1/1985 | Yanagida | 369/13 X |
| 4,730,289 | 3/1988 | Saitoh et al. | 369/13 OR |
| 4,807,210 | 2/1989 | Kaku et al. | 369/13 X |
| 4,907,212 | 3/1990 | Pharris et al. | 369/58 X |

FOREIGN PATENT DOCUMENTS

| | | |
|---|---|---|
| 0168155 | 1/1986 | European Pat. Off. |
| 0189187 | 7/1986 | European Pat. Off. |
| 54-095250 | 7/1979 | Japan |
| 57-186247 | 11/1982 | Japan ... 369/13 |
| 59-77648 | 5/1984 | Japan ... 369/13 |
| 61-187141 | 8/1986 | Japan ... 369/13 |
| 62-110673 | 5/1987 | Japan ... 369/13 |

OTHER PUBLICATIONS

The SPIE, vol. 695, Optical Mass Data Storage II (1986), pp. 239-242.
Uno, Japanese Patent Abstract, vol. 11, No. 156 (p. 578)[2603], 5-21-87, JP/61-292278.
Hashimoto, Japanese Patent Abstract, vol. 11, No. 148 (E. 506) [2595], 5/14/87, JP/61-287343.

*Primary Examiner*—Stuart S. Levy
*Assistant Examiner*—Hoa Nguyen
*Attorney, Agent, or Firm*—Antonelli, Terry Stout & Kraus

[57] ABSTRACT

A method and apparatus for recording a signal in a magneto-optical disk having pre-pits formed on a recording track which pits are optically detectable for generation of data read and write clocks. The method and apparatus includes the steps of: prior to writing data in the magnetooptical disk, writing a test pattern on a leading portion of a data recording area of the magnetooptical disk at predetermined timings; reading the data recording area to generate a time shift between the read-out test pattern and the original test pattern; adjusting the predetermined timings in accordance with the time shift to generate adjusted data write timings; and writing data in the data writing area in accordance with the adjusted data write timings and the apparatus therefore.

18 Claims, 11 Drawing Sheets

MAGNETOOPTICAL RECORDING METHOD AND APPARATUS UTILIZING SHIFT ADJUSTMENT

BACKGROUND OF THE INVENTION

The present invention relates to a recording method for magnetooptical disks and apparatus therefor, suitable for performing correct data demodulation by adjusting, at the time of data writing, a timing shift in forming data domains in a buried clock type magnetooptical disk.

Magnetooptical disks have been paid attention as an optical disk capable of changing the written information. A magnetooptical disk uses as its recording film a perpendicular magnetic film on which write data domains are formed through the thermomagnetic effect, and the written data are read through the magnetooptical effect. In data writing, the temperature of the magnetic film is raised to the Curie temperature by the heat of a laser light spot to thereby demagnetize the film. During the course of cooling, an external magnetic field is applied to set a perpendicular magnetization relative to the direction of magnetic field. The optic modulation method and magnetic modulation method are known as the method of forming magnetic domains. According to the former method, an external magnetic field of a predetermined intensity is applied to the perpendicular magnetic film in the direction opposite to the initial magnetization of the film, and the intensity of a laser light pulse is changed with the data to be written. According to the latter method, contrary to the former, the laser light intensity is maintained constant so as to make the temperature of the magnetic film have a temperature higher than or equal to the Curie temperature, and the direction of an external magnetic field is changed with the data to be written.

One of the problems associated particularly with the magnetic modulation method is that the area where the write magnetic field is applied becomes different from the area where the magnetic domain is formed. The reason for this is that the data write or data erase depends on the temperature distribution at the magnetic film and not on the light spot distribution. Although it depends upon the thermal conductivity, linear velocity and the like of a recording film, the peak of temperature distribution generally appears at the back of a light spot position. Since writing data starts at the temperature of the magnetic film higher than the Curie temperature, a domain is formed at a timing delayed from the time when a recording magnetic field is applied.

A data write timing shift, which is a problem associated particularly with the magnetic modulation method, will be described in detail with reference to FIG. 1 which shows the relationship between the overwrite timings and a read-out or reproduced signal. It is assumed not that a light spot 140 is positioned at time t0 within a data recording area of a track 120, i.e., between pits 110 and 111. An addition signal 18 of a P-polarized light component and an S-polarized light component respectively obtained through separation of a reflected light from the perpendicular magnetic film is used for detection of only the signals from the pit train 110 to 112. The addition signal 18 is supplied to a conventional binarizing circuit which binarizes signal 18 by using a threshold value, to obtain a binarized pit signal 25. The pit signal 25 is inputted to a PLL circuit as a phase reference signal to generate clocks 27. The clocks 27 are controlled by the PLL circuit so as to have a predetermined number of clocks between pits. The PLL circuit may employ a circuit arrangement used by a conventional magnetic or optical disk. It is assumed that data 34 modulated by a data modulation circuit is supplied as shown in FIG. 1. The light intensity distribution 141 of the light spot 140 at time t0 is a Gaussian distribution. Since the magnetic domain is generated at the area where the temperature of the perpendicular magnetic film goes higher than or is equal to the Curie temperature, not the light intensity distribution itself but the temperature distribution on the film should be taken into consideration. In practice the temperature distribution at time t0 is subjected to positional shift as shown in FIG. 1, depending on the movement amount of the light spot 140 and the thermal conductivity of the film. In the figure, $\Delta 1$ represents a positional shift relative to the center of the light spot where the film temperature goes higher than or equal to the Curie temperature, and $\Delta 2$ represents a shift caused by the thermal conductivity and linear velocity of the film. Therefore, a magnetic domain 144 is formed at the position shifted in the direction of disk rotation so that a leading edge portion of a subtraction signal 19 shown in FIG. 1, i.e., a read-out data signal, is shifted by $\Delta 3$ from the target leading edge of the modulated magnetic field. On condition that the shift $\Delta 3$ takes a constant value, it poses no problem only if the modulated data 34 are shifted, prior to application, by the corresponding amount.

However, in practice, the characteristics of the thermal conductivity and Curie temperature of a recording film are not always uniform. Further, in case where a read/write operation is performed at an equal angular velocity with a constant rotation speed, the linear velocity will change with the radius of a record track to accordingly change the shift amount which also is under the influence of a variation of medium constituents, thus substantially necessiating to check the shift amount for each data write timing (position).

Still further in case where the data modulation method having a self-clocking characteristic, such as Modified Frequency Modulation (MFM) method, Run Length Limit (RLL) method or the like is used, if the data write timing shift is uniform among respective write data domains, a shift among write data patterns poses no special problem. However, in case where the buried clock type disk is used which has pits formed previously to generate therefrom the data read clocks, and particularly where the magnetic modulation method is employed, there is a possibility of a timing shift between write data domains and the clocks during reading the data, in response to which clocks the recording magnetic fields were applied. If the data modulation method without a self-clock characteristic, such as Non Return to Zero (NRZ) method, is employed, the read clock information cannot be obtained directly from the data, thus resulting in an inability of correct demodulation.

If the magnetic modulation method in particular is applied to a buried clock type magnetooptical disk, it is important, as described above, to compensate for the data write timing shift by using proper means. An example of a magnetooptical disk recording apparatus realizing an overwrite operation through the magnetic modulation method is described in Japanese Patent Laid-open Publication JP-A-54-95250. In this apparatus, a laser beam is continuously applied to maintain the recording film at a raised temperature, and a magnet mounted around an objective lens of an optical head is driven in accordance with the data to be written, to thus perform a write and erase operation. This apparatus does not mention the data write timing shift and means for compensating for such shift.

SUMMARY OF THE INVENTION

The above prior art does not mention a shift between application timings of recording magnetic fields and data domain generation timings, i.e., a data write timing shift, thus posing a problem that it is difficult to apply this prior art to generating data read/write clocks from the pre-pit train and reading/writing data.

It is therefore an object of the present invention to provide a recording method for magnetooptical disks and apparatus therefor capable of realizing a correct read/write operation by adjusting the phases of data write timings (for example, the timing signal of data write clocks or the timing signal obtained through division of the clocks) at the time of data writing.

The above object is achieved by the provision of a recording method and apparatus therefor wherein prior to writing data, a test pattern for use in detecting a data write timing shift is written at a leading portion, within an area where the data are written and between pits, a shift (phase difference) with respect to time between the test pattern write timings and the generation timings of the magnetic domains of the test pattern, i.e., a shift between the original test pattern and the read-out test pattern, is calculated, the phases of the data write timings are adjusted to cancel out the shift, and the data are written at the adjusted timings.

Particularly, a shift of write timings of a test pattern which is written prior to data writing is detected using a data read beam, and the phases of data write clocks to be used for writing actual data are adjusted to cancel out the shift. For example, if such shift is an advance by $\Delta t$, the phases of data write clocks are delayed by $\Delta t$. In reading the written data, the clocks without such adjustment obtained from the pit train are used. In the above manner, by adjusting the data write timings at the time of data writing, it becomes possible to perform a correct data read/write operation.

DESCRIPTION OF THE PREFERRED EMBODIMENTS

Figure 2:
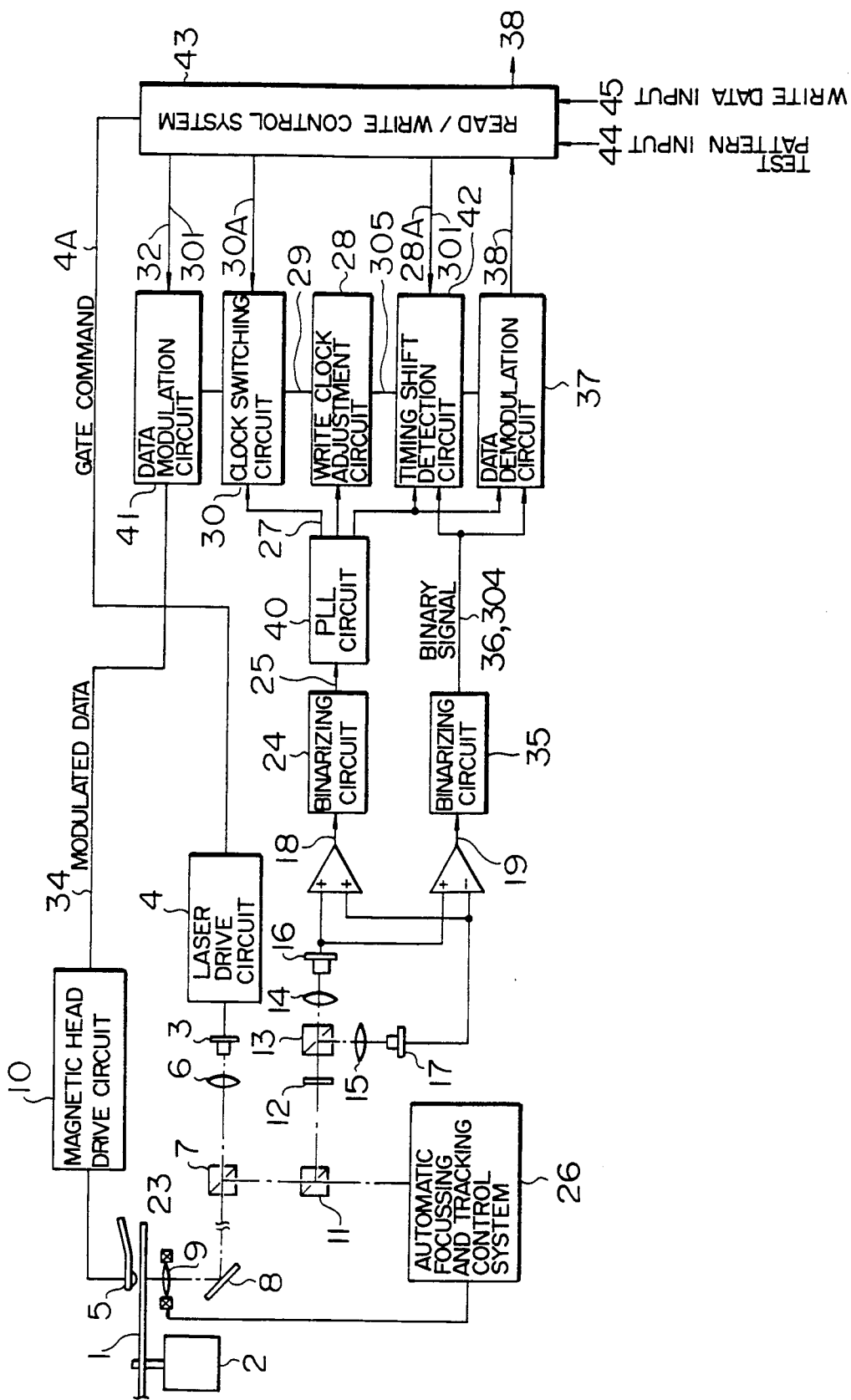
FIG. 2 is a block diagram showing an embodiment of a single beam magnetic modulation type magnetooptical disk read/write apparatus of this invention.

FIG. 2 shows the structure of a recording apparatus according to an embodiment of this invention, which apparatus is used for magnetooptical disks applying a one-beam magnetic modulation method. The basic structure of the apparatus and the read/write operation will first be described briefly.

A magnetooptical disk 1 has a perpendicular magnetic film, the main component of which is made of known elements. The disk 1 is provided with a clock format with pits buried therein beforehand for tracking and clock generation. The disk 1 is rotated by a spindle motor 2 having an appropriate drive system (not shown).

A laser drive circuit 4 operates, upon reception of a gate command 4A from a read/write control system 43 to be described later, to cause a semiconductor laser 3 to illuminate at a low power during data read operation, and at a high power during data write operation so as to raise the temperature of the magnetic film to the Curie temperature at which magnetization transition can be made. The laser drive circuit 4 may employ the circuit arrangement used by a conventional write-once type optical disk.

The operation of writing data on the disk 1 is carried out in the following manner. First, the semiconductor laser 3 is illuminated at a high power using the laser drive circuit 4.

A light beam from the semiconductor laser 3 is made parallel with a lens 6, passed through a beam splitter 7, reflected orthogonally at a galvanomirror 8, and focussed upon the magnetic film of the disk 1 via the disk substrate by a focussing lens 9, as a fine spot having a diameter of about 1 micron. By raising the temperature of the perpendicular magnetic film with heat generated by the focussed spot, a magnetic field modulated by data to be written is applied from a magnetic head 5 to the perpendicular magnetic film to write the data, i.e., to form a magnetic domain. Since the temperature of the perpendicular magnetic film rises over the Curie temperature at the area where the light spot is applied, the write operation is carried out while erasing the previously written data, i.e., the data to be written newly are overwritten in the similar manner as of magnetic disks. The magnetic head 5 is disposed slightly floating over the surface of the disk 1. The clearance between the magnetic head 5 and the disk 1 may be several tens microns which is large as compared with that of a magnetic disk having no auxiliary means such as a light beam. Therefore, a problem of head crash causing a scratch on the head or disk is not likely to occur. A magnetic head drive circuit 10 operates to change the direction of magnetic field to be generated from the magnetic head 5 in accordance with the modulated write data. The magnetic head drive circuit 10 may employ the circuit arrangement used by a conventional magnetic disk drive circuit.

Next, the operation of reading data recorded on the disk 1 will be described. Upon reception of a gate command from the read/write control system 43, the laser drive circuit 4 causes the semiconductor laser 3 to illuminate at a low power. The polarization plane of a light beam from the semiconductor laser 3 has a predetermined direction. The light beam is applied to the perpendicular magnetic film of the disk 1 through the same optical path as that during the write operation. The magnetization direction of the perpendicular magnetic film is either upward or downward depending upon the written data. Whether the written data is "1" or "0" is discriminated through detection of the magnetization direction. Such detection is performed using the Kerr effect which is one of the magnetooptical effects. According to the Kerr effect, the polarization plane of incident light rotates in the right or left direction depending upon the upward or downward magnetization direction. A reflected light from the perpendicular magnetic film with its polarization plane rotated is again reflected by the beam splitter 7 and a beam splitter 11, and applied to a halfwave plate 12 which is an optical device operating to rotate the polarization plane by 45 degrees. The light beam with its polarization plane rotated by 45 degrees is separated by a polarization beam splitter 13 into a P-polarized light component and an S-polarized light component which are focussed via lenses 14 and 15 onto light detectors 16 and 17, respectively. The addition signal of outputs from the light detectors 16 and 17 represents a change in intensity of light irrespective of its rotation of the polarization plane. Alternatively, the subtraction signal between outputs from the light detectors 16 and 17 represents a rotation of the polarization plane, and hence a change in magnetization direction, i.e., a change of data signal. In other words, the addition signal 18 can optically and separately detect only the concave and convex pits previously formed on the disk 1, whereas the subtraction signal 19 can optically and separately detect only a change in magnetization direction of the perpendicular magnetic film of the disk 1, i.e., only a change in written data. The light beam passed through the beam splitter 11 is also supplied to an automatic focussing/tracking control system 26 for detecting an out-of-focus signal and a tracking error signal which are used for driving, e.g., an actuator 23 to perform auto focussing/tracking.

The addition signal 18 is inputted to a binarizing circuit 24 to binarize it into a binary signal 25 which is applied to a PLL circuit to generate clocks 27. On the other hand, the subtraction signal 19 is inputted to another binarizing circuit 35 to binarize it into a binary signal 36 representative of the read data. The binary signal 36 is demodulated into a read data or reproduced data 38 by a data demodulation circuit 37 to which the clocks from the PLL circuit 40 are supplied. The read data 38 are supplied to the read/write control system 43 for control of the overall system. The read data 38 may be outputted, if necessary, from the read/write control system 43 to the external circuitry. The apparatus is provided, as its characteristic circuit portions, with a clock switching circuit 30, write clock adjustment circuit 28 and timing shift detection circuit 42 to all of which the clocks 27 from the PLL circuit 40 are supplied. The timing shift detection circuit 42 is supplied with the binary signal 36 from the binarizing circuit 35 and with a test pattern 301 from the read/write control system 43 to be later detailed, for generation of a shift from the read data 36 with respect to time.

The write clock adjustment circuit 28 is supplied with a shift signal from the timing shift detection circuit 42. The clocks 27 are adjusted based on the shift signal and outputted to the clock switching circuit 30 as write data clocks 29.

The clock switching circuit 30 outputs to the data modulation circuit 41 either the clocks 27 without adjustment or the write data clocks 29 in accordance with a switching signal 30A from the read/write control system 43. Upon reception of either the clocks 27 or the write data clocks 29, the data modulation circuit 41 receives either write data 32 or the test pattern 301 from the read/write control system 43 which is modulated by the corresponding clocks and outputted as the modulated data 34 to the magnetic head drive circuit 10.

The manner the apparatus constructed as above operates at the timings during data writing and at the timings during forming magnetic domains on the magneto-optical disk 1 will be described.

Figure 3:
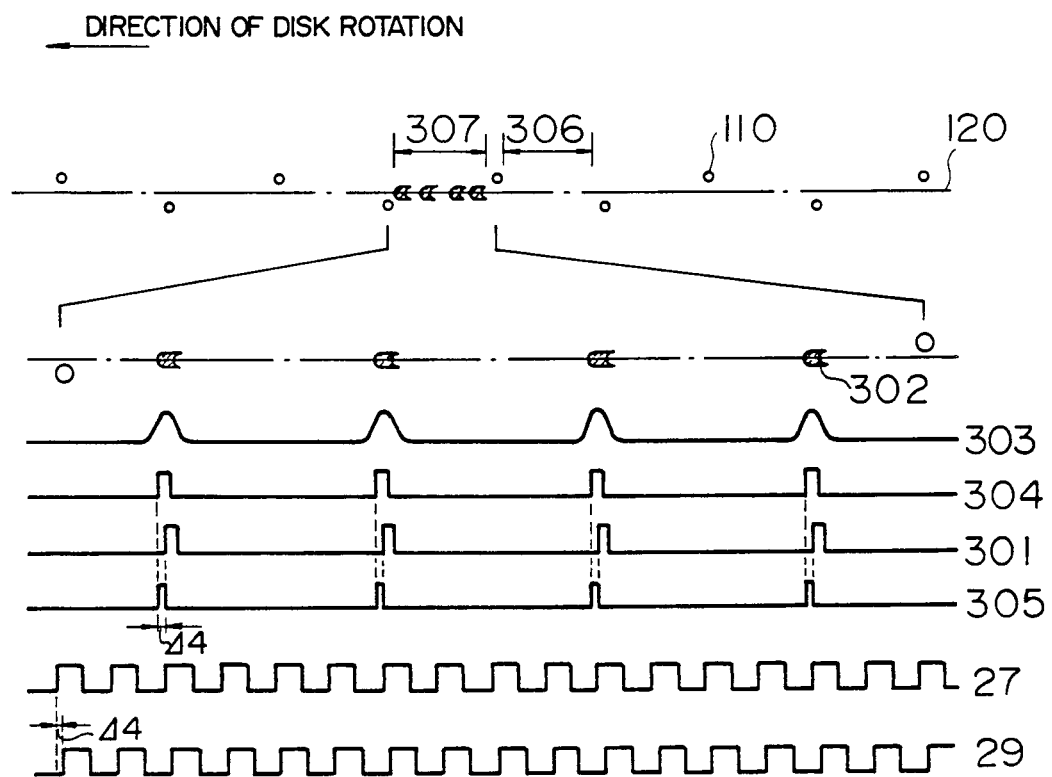
FIG. 3 shows the waveforms and a timing chart used for explaining the test pattern read/write characteristics of the embodiment apparatus shown in FIG. 2.

The timing chart of signals used for explaining the characteristic function of this invention is shown in FIG. 3. In the figure, a specific test pattern for detecting a write timing shift is written at the leading portion 307 of a data write area 306 and 307 on the track 120 formed with pre-pits 110. This test pattern write operation is achieved by outputting a test pattern signal 301 from the read/write control system 43 to the data modulation circuit 41, outputting the normal clocks 27 upon reception of a switching signal 30A by the clock switching circuit 30, and outputting as the modulated data 34 the test pattern signal 301 modulated at the timings of the clocks 27.

With the above operation, magnetic domains 302 are formed on the track of the magnetooptical disk 1. When the record area comes again after further rotation of the disk 1, a data write gate signal 4A is outputted from the read/write control system 43 to the laser drive circuit 4 to apply a light beam spot 140 at a low power and to read or reproduce the written test pattern. The read signal 303 is binarized by the binarizing circuit 35 to obtain a binary signal 36 as a read signal 304. The signal 304 is applied to the timing shift detection circuit 42 to compare it with the original test pattern 301 from the read/write control system 43 and obtain a shift signal 305 representative of a shift between two test pattern signals with respect to time. In this example shown in FIG. 3, the read-out test pattern 304 advances by $\Delta 4$ from the written test pattern. The shift signal 305 is supplied to the write clock adjustment circuit 28 to adjust the normal clocks 27 used at the time of writing test pattern and obtain data write clocks 29 which lag by $\Delta 4$ relative to the clocks 27.

Upon generation of the data write clocks 29 for the particular data write area (307 and 306), when the data write area again comes after further rotation of the disk 1, the light beam spot 140 is illuminated at a high power for writing data, and the write data clocks 29 selected by the clock switching circuit 30 upon reception of a switching signal 30A are supplied to the data modulation circuit 41. Under this condition, the necessary write data 32 are outputted to the data modulation circuit 41 to modulate the data at the timings of the write data clocks 29 and obtain the modulated data 34 which are written at the positions where the timing shift in forming magnetic domains can be compensated. In timing shift is adjusted immediately before writing data to thus allow correct data read/write operation. In the above embodiment, the data write clocks 29 have been generated by adjusting the phases of the clocks from the PLL circuit. However, the clocks may be generated by adjusting the phases of the timing signal obtained by dividing the clocks from the PLL circuit.

Further, the test pattern and the write data may be supplied, if necessary, from the external to the read/write control system 43.

Next, another embodiment of a magnetooptical disk recording apparatus of a two-beam type embodying the present invention will be described with reference to FIGS. 8 to 11.

Figure 8:
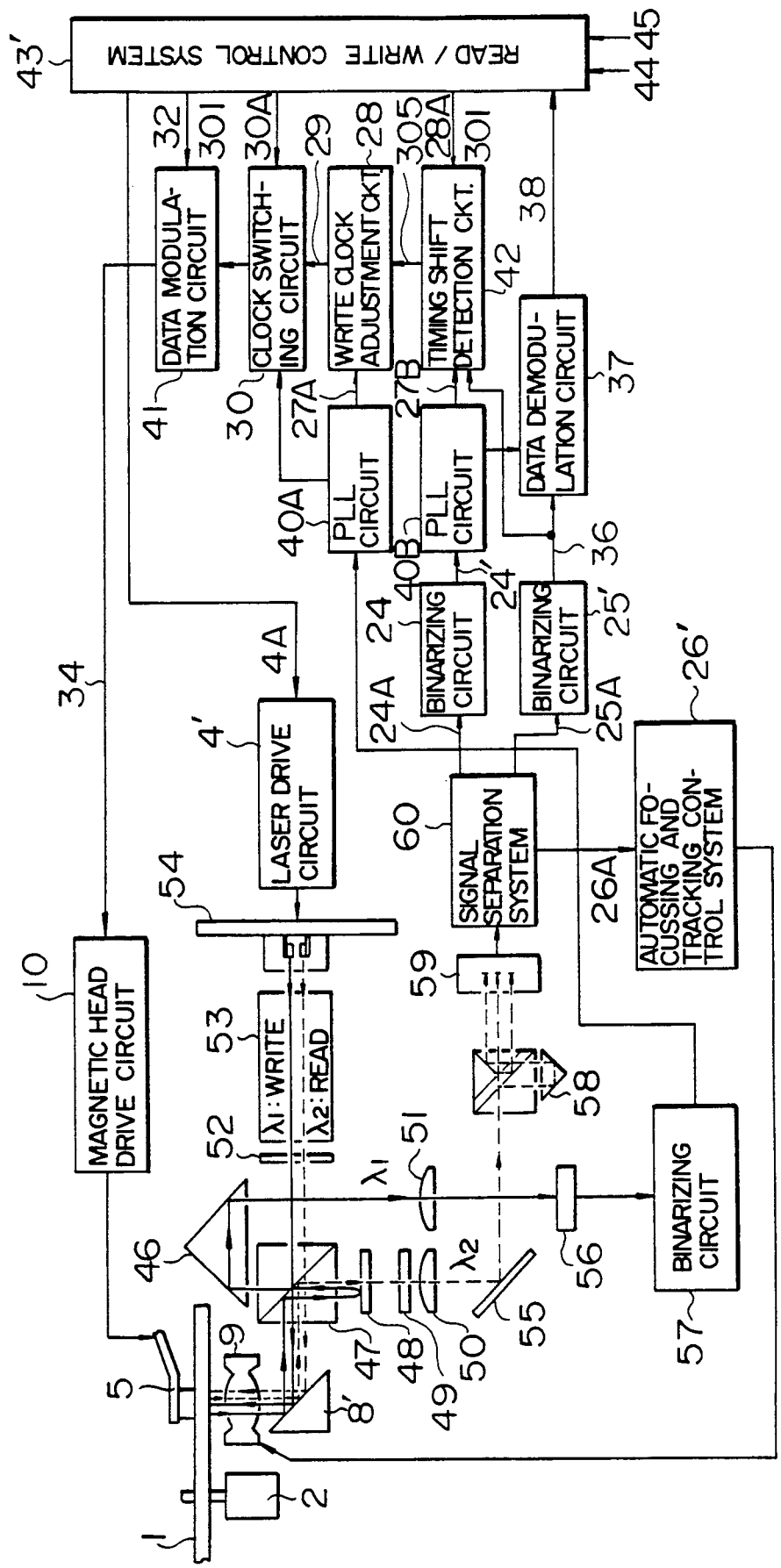
FIG. 8 is a block diagram showing another embodiment of the two beam magnetic modulation type magnetooptical disk recording apparatus of this invention.

In the apparatus shown in FIG. 8, two write and read beams are provided for enabling a READ AFTER WRITE operation. The read beam is disposed just after the write beam in the direction of data writing. A magnetic head 5 for supply of modulated data is disposed at the surface of the magnetooptical disk 1 opposite to the write beam side.

A write beam of wavelength of $\lambda_1$ emitted from a semiconductor laser 54 capable of radiating two beams is guided along an optical path shown by a solid line. That is, the write beam is first made parallel by a collimating lens 53, passes via a halfwave plate 52 through a beam splitter 47, reflected upward orthogonally by a mirror 8, and focussed onto the magnetic film of the disk 1 by a focussing lens 9 as a fine spot having a diameter of about 1 micron. The spot is applied at a high power during data writing, and at a low power other than the data writing. The operation during data writing is as follows. The write beam reflected from the disk 1 passes again the focussing mirror 9, reflected by a rectangular prism 46 after passing through a mirror 8, beam splitter 47, and wave separation filter 48, and applied to a light detector 56 after passing through a convex lens 51. The wave separation filter 48 passes the read beam with a wavelength of $\lambda_2$ and reflects the write beam with a wavelength of $\lambda_1$. In accordance with an output from the light detector 56, the light beam power during data writing is monitored and the data write clocks are read. The operation of reading the data write clocks will be described later. On the other hand, the read beam with a wavelength of $\lambda_2$ is guided along the optical path indicated by a broken line. That is, when the read beam reaches the wave separation filter 48 by passing through the similar optical path as of the write beam, it passes therethrough, is reflected by a mirror 55 after passing a halfwave plate 49 and convex lens 50, and applied to a light detector 59 via a detection prism 58. In accordance with an output from the light detector, an out-of-focus signal, tracking error signal and magnetooptical signal are derived. The structure of the detection prism 58 and light detector 59 is not directly related to the present invention so that the detail thereof is omitted. Conventional devices may be used for the prism 58 and detector 59.

An output from the light detector 59 is supplied to a signal separation system 60 which generates a data read clock signal 24A and read-out data signal 25A which are in turn supplied to binarizing circuits 24 and 25', respectively, to generate a data read binary clock signal 24' and read-out data binary signal 36. The data read binary clock signal 24' is transformed by a PLL circuit 40B into data read clocks 27B which are supplied to a timing shift detection circuit 42 and data demodulation circuit 37. The read-out data binary signal 36 is supplied also to the timing shift detection circuit 42 and data demodulation circuit 37.

On the other hand, an output from the light detector 56 is binarized by a binarizing circuit 57 and transformed by a PLL circuit 40A into data write clocks 27A which are supplied to a data write clock adjustment circuit 28 and clock switching circuit 30. The embodiment thus constructed uses both the write beam $\lambda_1$ and read beam $\lambda_2$ so that two types of data write clocks 27A and data read clocks 27B are used. However, the operation is essentially the same as that of the embodiment shown in FIG. 2. Thus, signal processing by a read/write control system 43 of the timing shift detection circuit 42, data write clock adjustment circuit 28, clock switching circuit 30, and data modulation circuit 41 is performed in the same manner as of the embodiment shown in FIG. 2.

The characteristic operating procedure of this embodiment using two write and read beams will be described with reference to the flow chart shown in FIG. 9. The read/write control system 43 controls the disk rotation drive system (not shown) and seeks a target track using the read beam $\lambda_2$ upon output of a gate signal 4A to a laser drive circuit 4 (step 900), and searches a target sector during further rotation of the disk (step 905). When the target sector comes, a test pattern 301 is outputted to the data modulation circuit 41, and the data write clocks 42 without adjustment are selected by the clock switching circuit 30, to thus write the test pattern at the leading portion of the target sector using the write beam $\lambda_1$ (step 910). Following the write operation of the test pattern 301, a READ AFTER WRITE operation is performed wherein the just written test pattern 301 is read using the read beam $\lambda_2$ positioned behind the write beam $\lambda_1$ in response to the data read clocks 43 (step 915). After obtaining a read signal 304 from the written test pattern 301, the signal 304 is processed at the timing shift detection circuit 42 and data write clock adjustment circuit 28 to obtain a timing shift amount and determine a data write clock adjustment amount $\Delta 4$ (step 920). Upon determination of the adjustment amount, the read/write control system 43 supplies a switching signal 30A to the clock switching circuit 30 to select the adjusted data read clocks which together with write data 32 are supplied to the data modulation circuit 41. The data 32 are written by using the magnetic head 5 through application of the write beam $\lambda_1$ to the disk (step 925). Thereafter, if necessary, the written data may be verified by positively utilizing the characteristic feature of the two beam method (step 930). The format of a track and the timing chart illustrating the above-described read/write operation are shown in FIG. 10. The record area a of the sector except the sector head is divided into a test area b and a data area c, and a test pattern is written at a leading portion of the test area b. Simultaneously therewith, a RAW (Read After Write) operation is performed during a period e following a period d by using the read beam to read the test pattern, and the adjustment amount is determined before the start point of the data area c. Writing data starts at the start point of the data area c, and the data are verified during a following period f.

Figure 9:
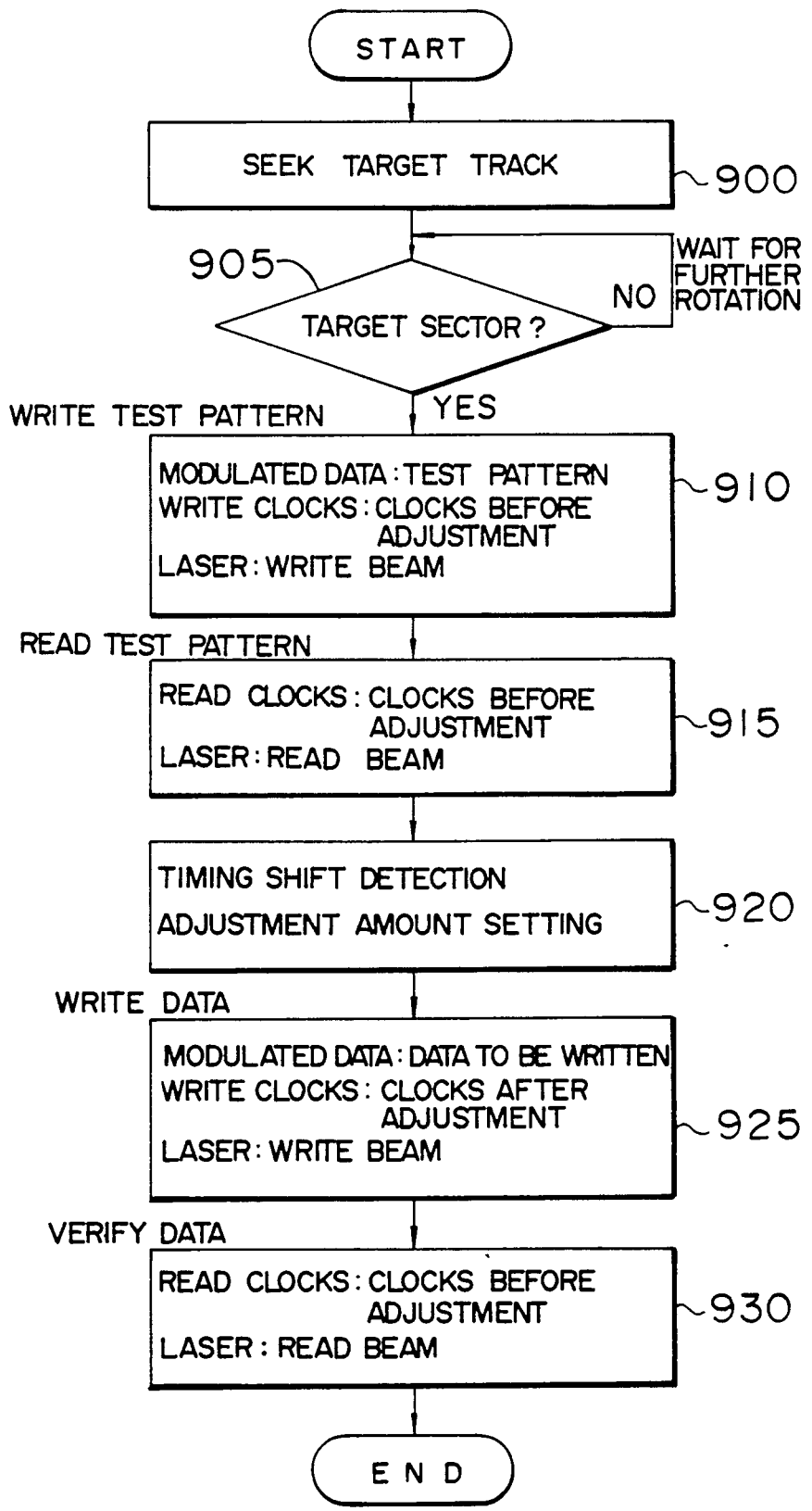
FIG. 9 is a flow chart illustrating the case where data are written immediately after a READ AFTER WRITE operation using two beams by the embodiment shown in FIG. 8.
Figure 10:
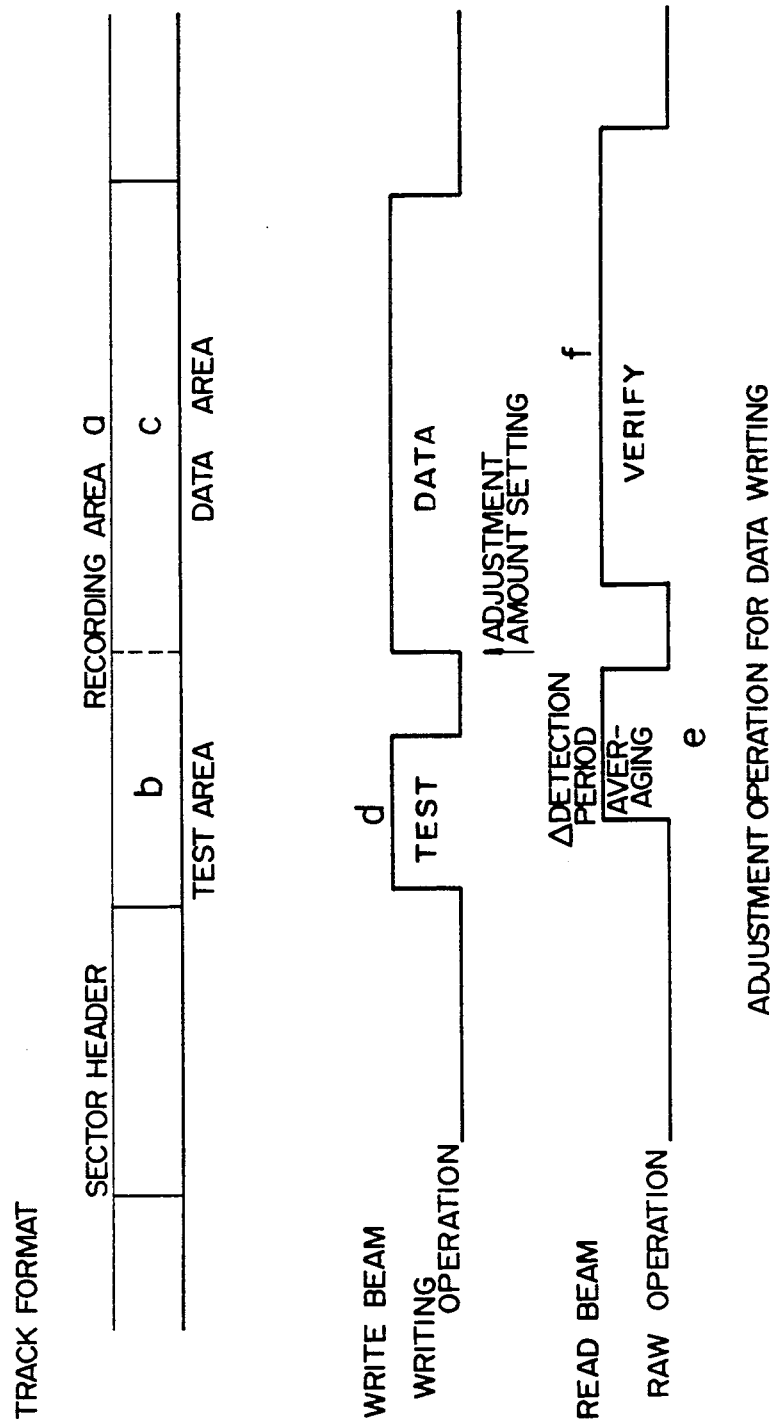
FIG. 10 is a timing chart illustrating the data writting by the READ AFTER WRITE operation shown in FIG. 9.

According to the data writing by the procedure shown in the flow chart of FIG. 9, the test area b of the record area a shown in FIG. 10 becomes waistful with respect to writing data. However, time required for writing data can be economized by positively utilizing the characteristic feature of the READ AFTER WRITE operation.

Figure 11:
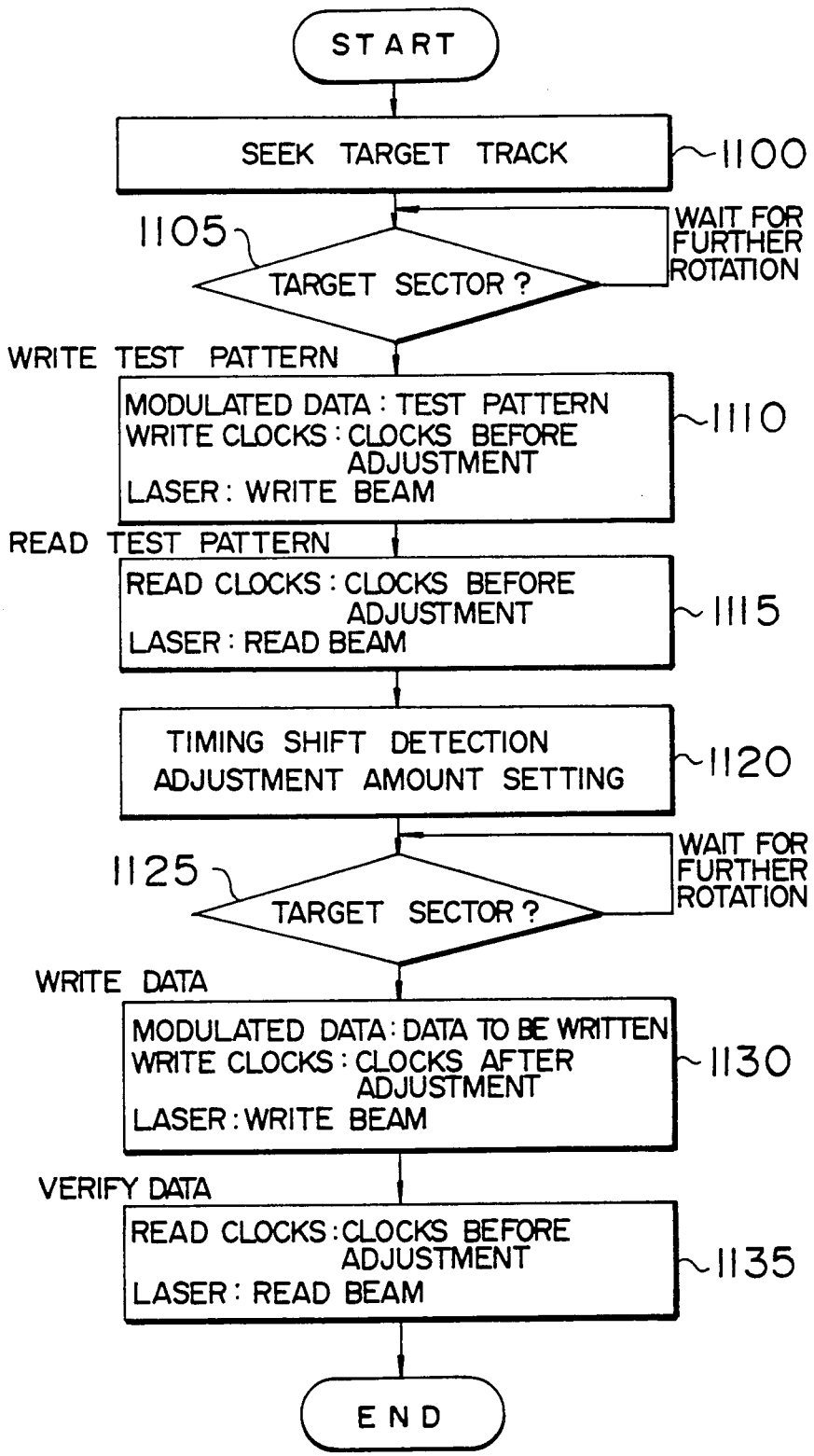
FIG. 11 is a timing chart illustrating the case where data are written after further rotation of the disk after the READ AFTER WRITE operation by the embodiment shown in FIG. 8, in order to minimize the loss of recording area.

In order to use the data write area economically rather than to allow time loss more or less, as shown in the flow chart of FIG. 11, after a step 1120 where the timing shift and the adjustment amount are determined, a step 1125 is added where the start position of a target sector is waited during further rotation of the disk so that the area of the track can be used without loss with respect to writing data. The other steps of the flow chart shown in FIG. 11 are the same as of the flow chart of FIG. 9, so the description therefore is omitted.

In the embodiments of the magnetooptical disk recording apparatus of one beam and two-beam types, although the magnetic modulation method which particularly poses a problem of the timing shift in forming magnetic domains has been used by way of example, the optic modulation method may also be applied to eliminate a deviation between data write and read timings.

Further, in the above embodiments, a pre-format shown in FIG. 3 has been used. However, the present invention is also applicable to other pre-formats shown, for example, in FIG. 2 of "Formats for 5 ¼" optical disk system", The Society of Photo-Optical Instrumentation Engineers, Vol. 695, Optical Mass Storage II, 1986, pp. 239 to 242. In this case, data are written between sample zones, and a track shift signal is detected from the sample zone by using the same principle as of the present embodiments.

According to the present invention, in a recording method for a magnetooptical disk having pits previously formed on a record track which pits are optically detectable to generate data read/write clocks, the data read clocks are adjusted in accordance with a shift between application timings of recording magnetic fields and generation timings of magnetic domains. Therefore, even if the data write timing shift is present, the phases of data write clocks can be adjusted so that a correct data read/write operation can be carried out without influence of a timing shift. Further, various types of data modulation methods can be used irrespective of their self-clock characteristics. Furthermore, since such adjustment is performed at the time of data writing, data are prevented from being written in an undesirable area near a pre-pit.

We claim:

1. A method of recording a signal in a magneto-optical disk having pre-pits formed on a recording track which pits are optically detectable and are read out for enabling generation of data read clocks and data write clocks and wherein means including light beam means and magnetic field generating means are provided for recording or writing data onto said magnetooptical disk or reading data therefrom, comprising the steps of:
   prior to writing data in said magnetooptical disk, writing a test pattern in accordance with a test pattern signal to form a magnetized domain in a leading portion of a data recording area of said magnetooptical disk in accordance with predetermined data write timings;
   reading said test pattern by reading said leading portion of said data recording area to generate a reproduced signal of said magnetized domain;
   detecting a time shift between said reproduced signal of said magnetized domain and said test pattern signal;
   adjusting said data write timings in accordance with said time shift; and
   recording data in said data recording area in accordance with said adjusted data write timings.

2. A method according to claim 1, wherein said adjusted data write timings are data write clocks.

3. A method according to claim 2, wherein said adjusted data write timings are obtained by adjusting data write clocks generated by reading out of pre-pits.

4. A method according to claim 1, wherein said time shift is a shift between said test pattern signal and said reproduced signal of said magnetized domain formed in said magnetooptical disk in correspondence with said test pattern.

5. A method according to claim 1, wherein said light beam means includes means for providing a laser light pulse and means for changing the intensity of the laser light pulse, and said step of writing said test pattern and said step of recording data are performed by changing the intensity of the laser light pulse in accordance with said test pattern and data, respectively.

6. A method according to claim 1, wherein said magnetic field generating means includes drive means for changing a direction of a generated magnetic field and said step of writing said test pattern and said step of recording data are performed by changing the direction of the generated magnetic field in accordance with said test pattern and data, respectively.

7. A method according to claim 1, wherein said writing of said test pattern is performed by predetermined units of as sector assigned on said magnetooptical disk.

8. A method according to claim 1, wherein said reading of said test pattern is performed, after writing of said test pattern, after one rotation of said magnetooptical disk by using a light beam which is used for writing said test pattern and which is emitted from said light beam means.

9. A method according to claim 1, wherein said writing of said test pattern is performed using a light beam emitted from said light beam means and sequentially thereafter, reading said test pattern is performed using a different light beam emitted from said light beam means.

10. A method according to claim 1, wherein said writing of said test pattern is performed using a light beam emitted from said light beam means, and after one rotation of said magnetooptical disk reading said test pattern is performed using the same light beam.

11. A recording apparatus, for magnetooptical disk formed with pre-pits, for reading/writing data in accordance with a predetermined pre-pit clock signal based upon reading out said pre-pits using a magnetic head and light beam head constituting read-write means, comprising:
   time shift detection means for receiving a predetermined test pattern signal in synchronism with predetermined clocks and a read-out signal of a test pattern written in said magnetooptical disk according to said test pattern signal, and detecting a time shift therebetween;
   clock adjustment means for adjusting said predetermined clocks in accordance with said detected time shift detected by said timing shift detection means to generate adjusted clocks;
   clock switching means for receiving said predetermined clocks and said adjusted clocks, and selectively outputting ones of said predetermined clocks and said adjusted clocks upon reception of a predetermined switching signal;

data modulation means for receiving one of said predetermined test pattern signal and write data, modulating said received one at the timings of ones of either one of said predetermined clocks and said adjusted clocks inputted from said clock switching means, and outputting said modulated received one to said read-write means; and control means for generating said predetermined clocks and adapted to operate such that in writing said test pattern in said magnetooptical disk, said predetermined test pattern signal is outputted to said data modulation means, and said predetermined switching signal is outputted to said clock switching means to supply said predetermined clocks to said data modulation means, in reading said test pattern written in said magnetooptical disk, a read-out signal of said test pattern is outputted to said timing shift detection means, and in writing data, said predetermined switching signal is outputted to said clock switching means to output said adjusted clocks to said data modulation means to which said write data are also outputted.

12. A recording apparatus according to claim 11, wherein said magnetic head enables writing of said test pattern and said data.

13. A recording apparatus according to claim 12, wherein said light beam head provides a write light beam for writing in cooperation with said magnetic head and a read light beam for reading, said timing shift detection means includes means for detection of the test pattern and the pre-pits from the disk in response to reflection of said read beam, and said clock adjustment means adjusts write clocks in accordance with a signal generated from reflection of said write beam, and said clock switching means selectively outputs ones of read clocks generated from reflection of said read beam and said adjusted clocks.

14. A recording apparatus according to claim 11, wherein said light beam head enables reading of said test pattern and said data.

15. A recording apparatus according to claim 14, wherein said light beam head is constructed so as to emit one beam.

16. A recording apparatus according to claim 11, wherein said predetermined test pattern signal is generated within said control means by dividing a logical-AND of said predetermined pre-pit clock signal and said predetermined clocks.

17. A recording apparatus according to claim 11, wherein said clock adjustment means generates said adjusted clocks by adjusting the phases of said predetermined clocks.

18. A recording apparatus according to claim 11, wherein said clock adjustment means generates said adjusted clocks by dividing said predetermined clocks.

* * * * *

UNITED STATES PATENT AND TRADEMARK OFFICE
CERTIFICATE OF CORRECTION

PATENT NO. : 5,060,208
DATED : Dec. 22, 1988
INVENTOR(S) : Nagai, et al.

It is certified that error appears in the above-identified patent and that said Letters Patent is hereby corrected as shown below:

Please delete columns 1-14 and substitute columns 1-12 as per attached.

Signed and Sealed this

Tenth Day of March, 1998

Attest:

BRUCE LEHMAN

Attesting Officer

Commissioner of Patents and Trademarks

MAGNETOOPTICAL RECORDING METHOD AND APPARATUS UTILIZING SHIFT ADJUSTMENT

BACKGROUND OF THE INVENTION

The present invention relates to a recording method for magnetooptical disks and apparatus therefor, suitable for performing correct data demodulation by adjusting, at the time of data writing, a timing shift in forming data domains in a buried clock type magneto-optical disk.

Magnetooptical disks have been paid attention as an optical disk capable of changing the written information. A magnetooptical disk uses as its recording film a perpendicular magnetic film on which write data domains are formed through the thermomagnetic effect, and the written data are read through the magnetooptical effect. In data writing, the temperature of the magnetic film is raised to the Curie temperature by the heat of a laser light spot to thereby demagnetize the film. During the course of cooling, an external magnetic field is applied to set a perpendicular magnetization relative to the direction of magnetic field. The optic modulation method and magnetic modulation method are known as the method of forming magnetic domains. According to the former method, an external magnetic field of a predetermined intensity is applied to the perpendicular magnetic film in the direction opposite to the initial magnetization of the film, and the intensity of a laser light pulse is changed with the data to be written. According to the latter method, contrary to the former, the laser light intensity is maintained constant so as to make the temperature of the magnetic film have a temperature higher than or equal to the Curie temperature, and the direction of an external magnetic field is changed with the data to be written.

One of the problems associated particularly with the magnetic modulation method is that the area where the write magnetic field is applied becomes different from the area where the magnetic domain is formed. The reason for this is that the data write or data erase depends on the temperature distribution at the magnetic film and not on the light spot distribution. Although it depends upon the thermal conductivity, linear velocity and the like of a recording film, the peak of temperature distribution generally appears at the back of a light spot position. Since writing data starts at the temperature of the magnetic film higher than the Curie temperature, a domain is formed at a timing delayed from the time when a recording magnetic field is applied.

Figure 1:
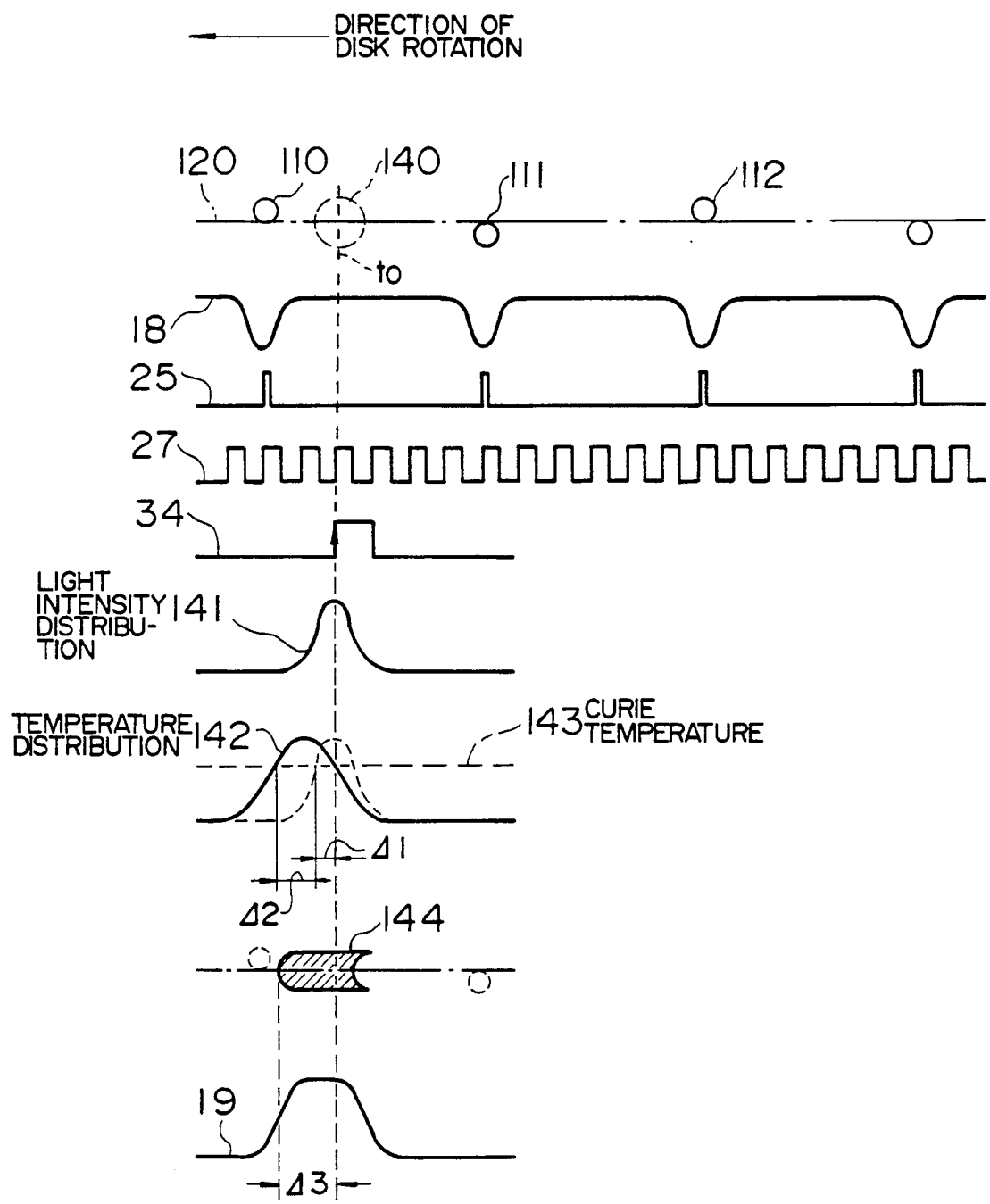
FIG. 1 shows the waveforms and a timing chart used for explaining the problem associated with a conventional magnetooptical disk read/write method.

A data write timing shift, which is a problem associated particularly with the magnetic modulation method, will be described in detail with reference to FIG. 1 which shows the relationship between the overwrite timings and a read-out or reproduced signal. It is assumed not that a light spot 140 is positioned at time t0 within a data recording area of a track 120, i.e., between pits 110 and 111. An addition signal 18 of a P-polarized light component and an S-polarized light component respectively obtained through separation of a reflected light from the perpendicular magnetic film is used for detection of only the signals from the pit train 110 to 112. The addition signal 18 is supplied to a conventional binarizing circuit which binarizes signal 18 by using a threshold value, to obtain a binarized pit signal 25. The pit signal 25 is inputted to a PLL circuit as a phase reference signal to generate clocks 27. The clocks 27 are controlled by the PLL circuit so as to have a predetermined number of clocks between pits. The PLL circuit may employ a circuit arrangement used by a conventional magnetic or optical disk. It is assumed that data 34 modulated by a data modulation circuit is supplied as shown in FIG. 1. The light intensity distribution 141 of the light spot 140 at time t0 is a Gaussian distribution. Since the magnetic domain is generated at the area where the temperature of the perpendicular magnetic film goes higher than or is equal to the Curie temperature, not the light intensity distribution itself but the temperature distribution on the film should be taken into consideration. In practice, the temperature distribution at time t0 is subjected to positional shift as shown in FIG. 1, depending on the movement amount of the light spot 140 and the thermal conductivity of the film. In the figure, Δ1 represents a positional shift relative to the center of the light spot where the film temperature goes higher than or equal to the Curie temperature, and Δ2 represents a shift caused by the thermal conductivity and linear velocity of the film. Therefore, a magnetic domain 144 is formed at the position shifted in the direction of disk rotation so that a leading edge portion of a subtraction signal 19 shown in FIG. 1, i.e., a read-out data signal, is shifted by Δ3 from the target leading edge of the modulated magnetic field. On condition that the shift Δ3 takes a constant value, it poses no problem only if the modulated data 34 are shifted, prior to application, by the corresponding amount.

However, in practice, the characteristics of the thermal conductivity and Curie temperature of a recording film are not always uniform. Further, in case where a read/write operation is performed at an equal angular velocity with a constant rotation speed, the linear velocity will change with the radius of a record track to accordingly change the shift amount which also is under the influence of a variation of medium constituents, thus substantially necessitating to check the shift amount for each data write timing (position).

Still further in case where the data modulation method having a self-clocking characteristic, such as Modified Frequency Modulation (MFM) method, Run Length Limit (RLL) method or the like is used, if the data write timing shift is uniform among respective write data domains, a shift among write data patterns poses no special problem. However, in case where the buried clock type disk is used which has pits formed previously to generate therefrom the data read clocks, and particularly where the magnetic modulation method is employed, there is a possibility of a timing shift between write data domains and the clocks during reading the data, in response to which clocks the recording magnetic fields were applied. If the data modulation method without a self-clock characteristic, such as Non Return to Zero (NRZ) method, is employed, the read clock information cannot be obtained directly from the data, thus resulting in an inability of correct demodulation.

If the magnetic modulation method in particular is applied to a buried clock type magnetooptical disk, it is important, as described above, to compensate for the data write timing shift by using proper means. An example of a magnetooptical disk recording apparatus realizing an overwrite operation through the magnetic modulation method is described in Japanese Patent Laid-open Publication JP-A-54-95250. In this apparatus, a laser beam is continuously applied to maintain the recording film at a raised temperature, and a magnet mounted around an objective lens of an optical head is driven in accordance with the data to be written, to thus perform a write and erase operation. This apparatus does not mention the data write timing shift and means for compensating for such shift.

SUMMARY OF THE INVENTION

The above prior art does not mention a shift between application timings of recording magnetic fields and data domain generation timings, i.e., a data write timing shift, thus posing a problem that it is difficult to apply this prior art to generating data read/write clocks from the pre-pit train and reading/writing data.

It is therefore an object of the present invention to provide a recording method for magnetooptical disks and apparatus therefor capable of realizing a correct read/write operation by adjusting the phases of data write timings (for example, the timing signal of data write clocks or the timing signal obtained through division of the clocks) at the time of data writing.

The above object is achieved by the provision of a recording method and apparatus therefor wherein prior to writing data, a test pattern for use in detecting a data write timing shift is written at a leading portion, within an area where the data are written and between pits, a shift (phase difference) with respect to time between the test pattern write timings and the generation timings of the magnetic domains of the test pattern, i.e., a shift between the original test pattern and the read-out test pattern, is calculated, the phases of the data write timings are adjusted to cancel out the shift, and the data are written at the adjusted timings.

Particularly, a shift of write timings of a test pattern which is written prior to data writing is detected using a data read beam, and the phases of data write clocks to be used for writing actual data are adjusted to cancel out the shift. For example, if such shift is an advance by $\Delta t$, the phases of data write clocks are delayed by $\Delta t$. In reading the written data, the clocks without such adjustment obtained from the pit train are used. In the above manner, by adjusting the data write timings at the time of data writing, it becomes possible to perform a correct data read/write operation.

BRIEF DESCRIPTION OF THE DRAWINGS

Figure 4:
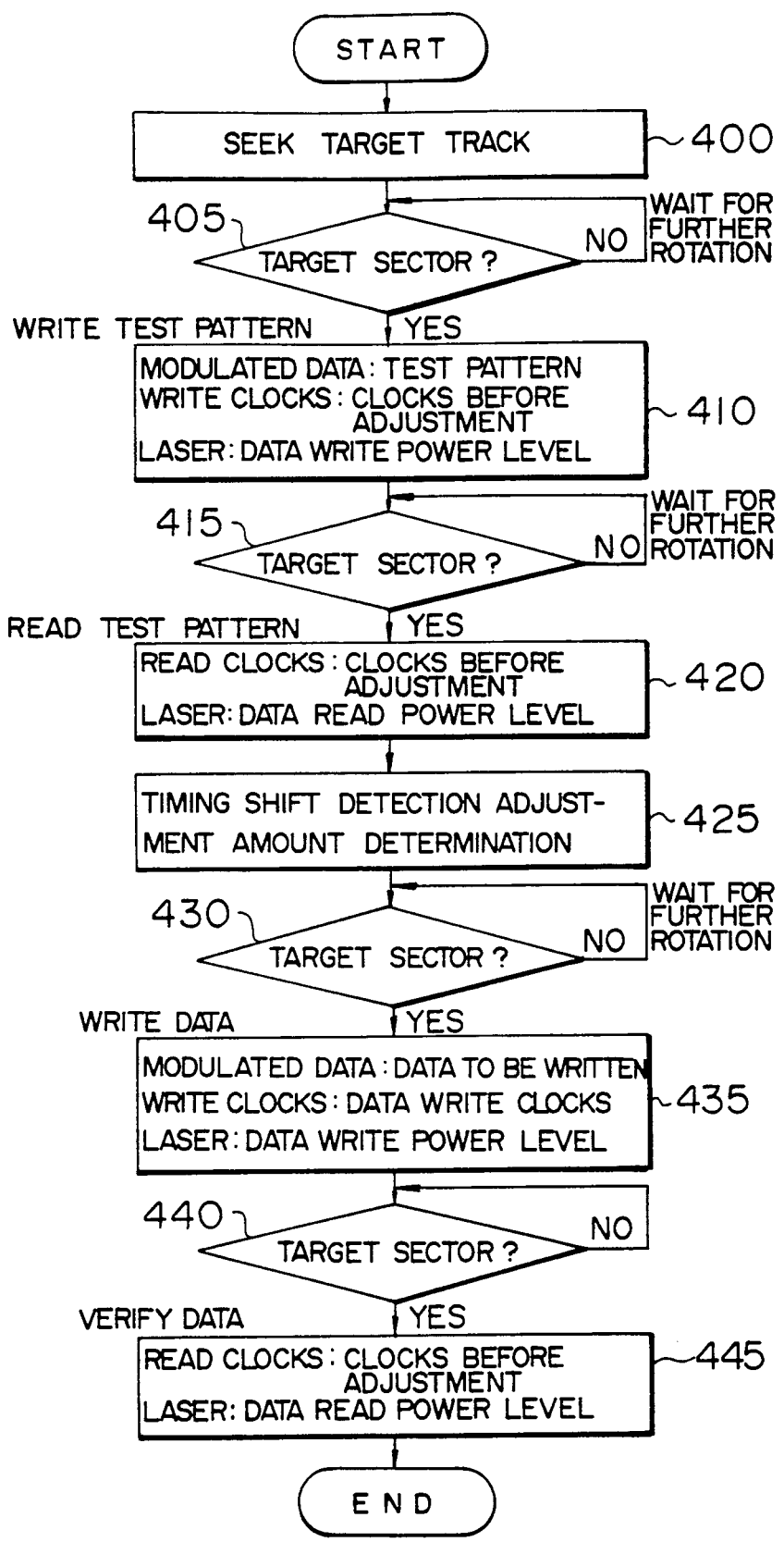
FIG. 4 is a flow chart showing the operation by the read/write control system of the embodiment apparatus shown in FIG. 2.
Figure 5:
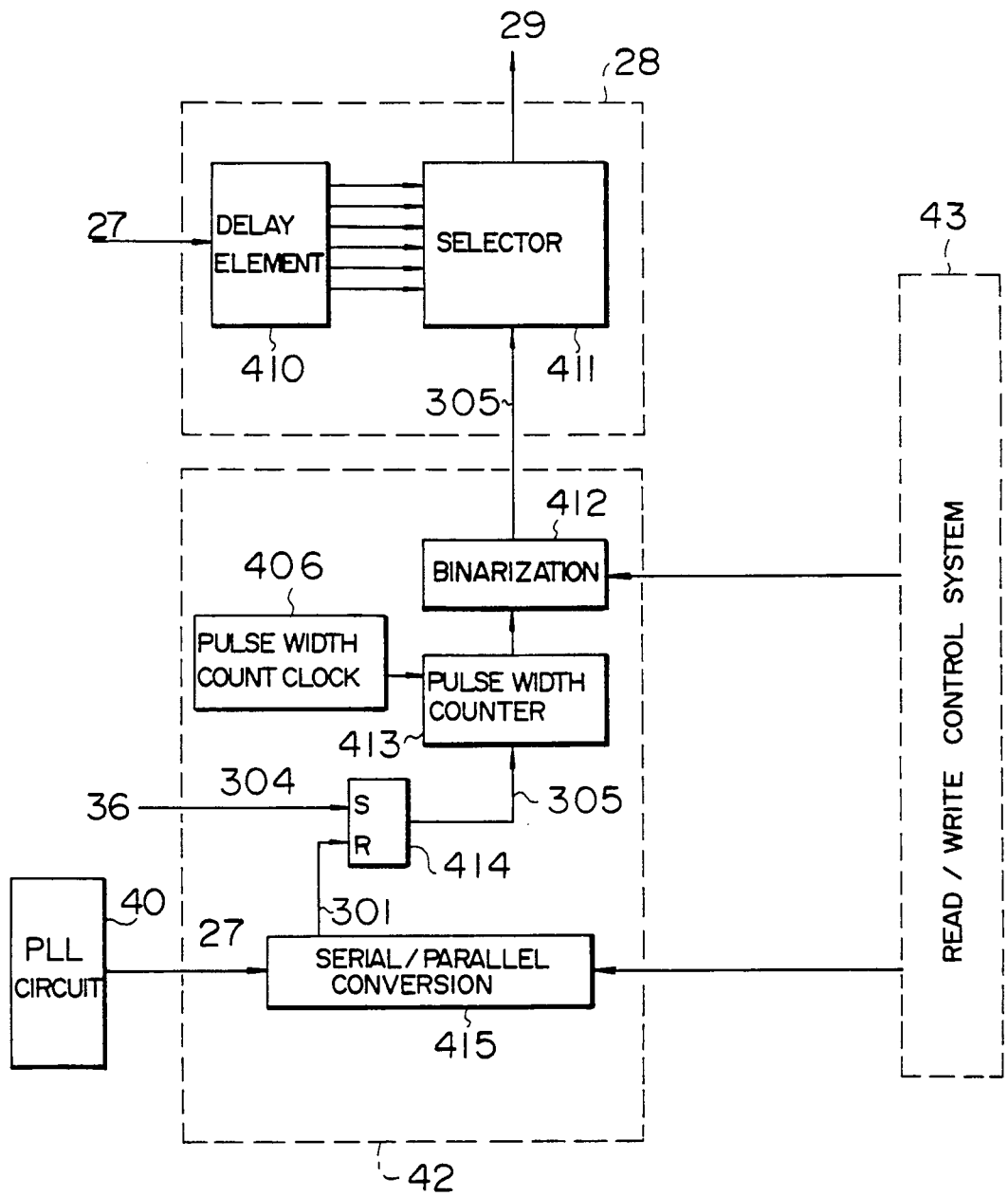
FIG. 5 shows the detailed circuit arrangement of the data write clock adjustment circuit and timing shift detection circuit shown in FIG. 2.
Figure 6:
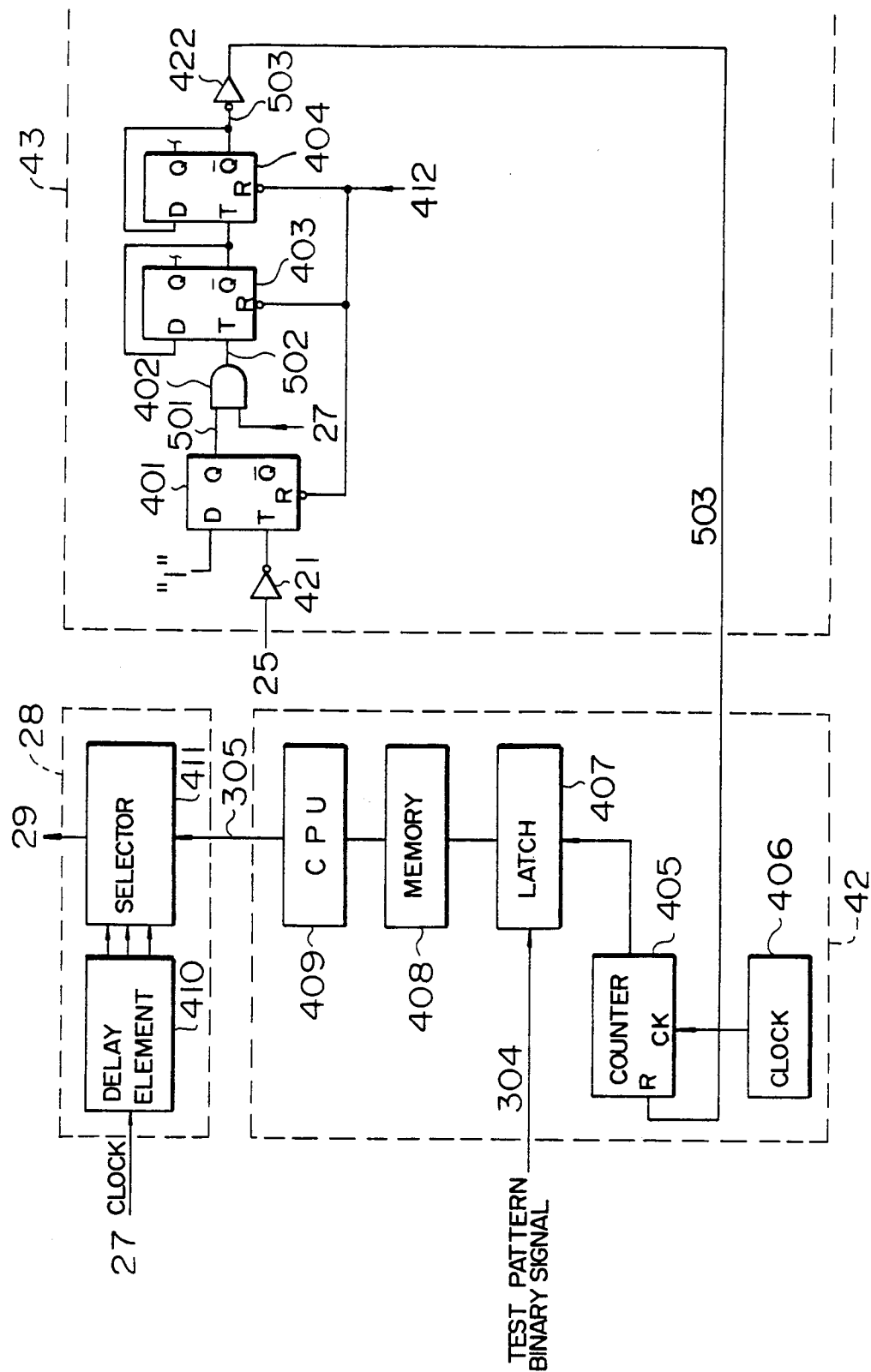
FIGS. 6 and 7 show another example of the detailed circuit arrangement of the data write clock adjustment circuit and timing shift detection circuit shown in FIG. 2 and its timing chart, respectively.
Figure 7:
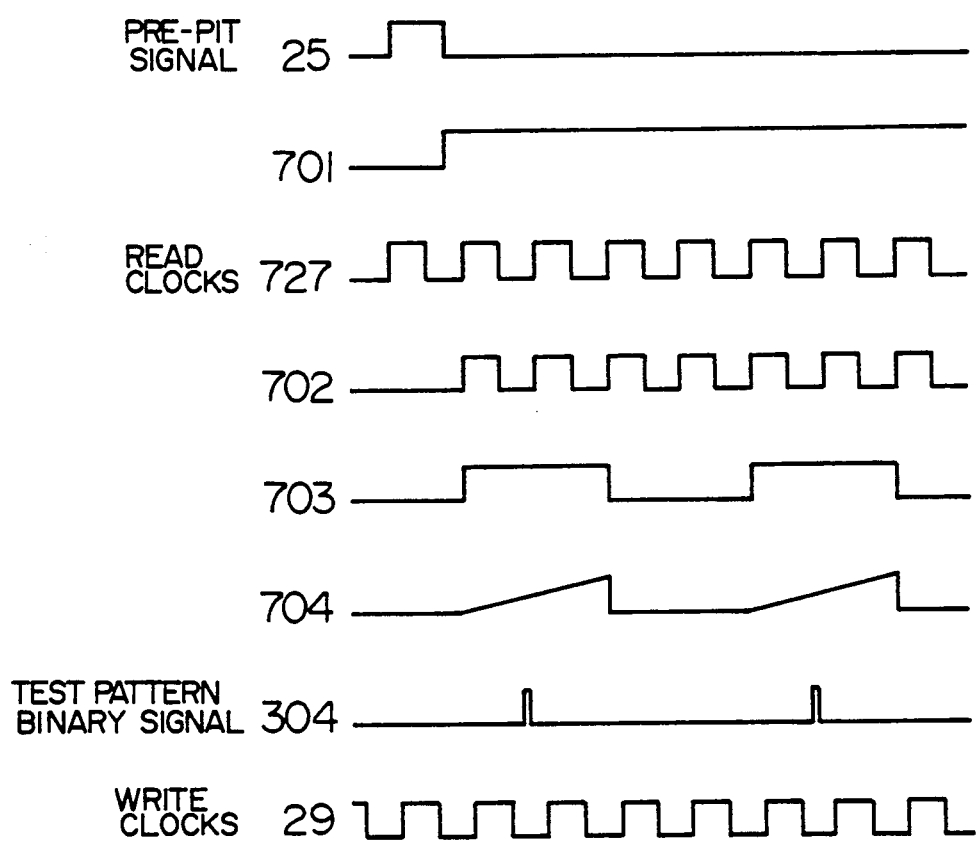

FIG. 1 shows the waveforms and a timing chart used for explaining the problem associated with a conventional magnetooptical disk read/write method;

FIG. 2 is a block diagram showing an embodiment of a single beam magnetic modulation type magnetooptical disk read/write apparatus of this invention;

FIG. 3 shows the waveforms and a timing chart used for explaining the test pattern read/write characteristics of the embodiment apparatus shown in FIG. 2;

FIG. 4 is a flow chart showing the operation by the read/write control system of the embodiment apparatus shown in FIG. 2;

FIG. 5 shows the detailed circuit arrangement of the data write clock adjustment circuit and timing shift detection circuit shown in FIG. 2;

FIGS. 6 and 7 show another example of the detailed circuit arrangement of the data write clock adjustment circuit and timing shift detection circuit shown in FIG. 2 and its timing chart, respectively;

FIG. 8 is a block diagram showing another embodiment of the two beam magnetic modulation type magnetooptical disk recording apparatus of this invention;

FIG. 9 is a flow chart illustrating the case where data are written immediately after a READ AFTER WRITE operation using two beams by the embodiment shown in FIG. 8;

FIG. 10 is a timing chart illustrating the data writting by the READ AFTER WRITE operation shown in FIG. 9; and FIG. 11 is a timing chart illustrating the case where data are written after further rotation of the disk after the READ AFTER WRITE operation by the embodiment shown in FIG. 8, in order to minimize the loss of recording area.

DESCRIPTION OF THE PREFERRED EMBODIMENTS

FIG. 2 shows the structure of a recording apparatus according to an embodiment of this invention, which apparatus is used for magnetooptical disks applying a one-beam magnetic modulation method. The basic structure of the apparatus and the read/write operation will first be described briefly.

A magnetooptical disk 1 has a perpendicular magnetic film, the main component of which is made of known elements. The disk 1 is provided with a clock format with pits buried therein beforehand for tracking and clock generation. The disk 1 is rotated by a spindle motor 2 having an appropriate drive system (not shown).

A laser drive circuit 4 operates, upon reception of a gate command 4A from a read/write control system 43 to be described later, to cause a semiconductor laser 3 to illuminate at a low power during data read operation, and at a high power during data write operation so as to raise the temperature of the magnetic film to the Curie temperature at which magnetization transition can be made. The laser drive circuit 4 may employ the circuit arrangement used by a conventional write-once type optical disk.

The operation of writing data on the disk 1 is carried out in the following manner. First, the semiconductor laser 3 is illuminated at a high power using the laser drive circuit 4.

A light beam from the semiconductor laser 3 is made parallel with a lens 6, passed through a beam splitter 7, reflected orthogonally at a galvanomirror 8, and focussed upon the magnetic film of the disk 1 via the disk substrate by a focussing lens 9, as a fine spot having a diameter of about 1 micron. By raising the temperature of the perpendicular magnetic film with heat generated by the focussed spot, a magnetic field modulated by data to be written is applied from a magnetic head 5 to the perpendicular magnetic film to write the data, i.e., to form a magnetic domain. Since the temperature of the perpendicular magnetic film rises over the Curie temperature at the area where the light spot is applied, the write operation is carried out while erasing the previously written data, i.e., the data to be written newly are overwritten in the similar manner as of magnetic disks. The magnetic head 5 is disposed slightly floating over the surface of the disk 1. The clearance between the magnetic head 5 and the disk 1 may be several tens microns which is large as compared with that of a magnetic disk having no auxiliary means such as a light beam. Therefore, a problem of head crash causing a scratch on the head or disk is not likely to occur. A magnetic head drive circuit 10 operates to change the direction of magnetic field to be generated from the magnetic head 5 in accordance with the modulated write data. The magnetic head drive circuit 10 may employ the circuit arrangement used by a conventional magnetic disk drive circuit.

Next, the operation of reading data recorded on the disk 1 will be described. Upon reception of a gate command from the read/write control system 43, the laser drive circuit 4 causes the semiconductor laser 3 to illuminate at a low power. The polarization plane of a light beam from the semiconductor laser 3 has a predetermined direction. The light beam is applied to the perpendicular magnetic film of the disk 1 through the same optical path as that during the write operation. The magnetization direction of the perpendicular magnetic film is either upward or downward depending upon the written data. Whether the written data is "1" or "0" is discriminated through detection of the magnetization direction. Such detection is performed using the Kerr effect which is one of the magnetooptical effects. According to the Kerr effect, the polarization plane of incident light rotates in the right or left direction depending upon the upward or downward magnetization direction. A reflected light from the perpendicular magnetic film with its polarization plane rotated is again reflected by the beam splitter 7 and a beam splitter 11, and applied to a halfwave plate 12 which is an optical device operating to rotate the polarization plane by 45 degrees. The light beam with its polarization plane rotated by 45 degrees is separated by a polarization beam splitter 13 into a P-polarized light component and an S-polarized light component which are focussed via lenses 14 and 15 onto light detectors 16 and 17, respectively. The addition signal of outputs from the light detectors 16 and 17 represents a change in intensity of light irrespective of its rotation of the polarization plane. Alternatively, the subtraction signal between outputs from the light detectors 16 and 17 represents a rotation of the polarization plane, and hence a change in magnetization direction, i.e., a change of data signal. In other words, the addition signal 18 can optically and separately detect only the concave and convex pits previously formed on the disk 1, whereas the subtraction signal 19 can optically and separately detect only a change in magnetization direction of the perpendicular magnetic film of the disk 1, i.e., only a change in written data. The light beam passed through the beam splitter 11 is also supplied to an automatic focussing/tracking control system 26 for detecting an out-of-focus signal and a tracking error signal which are used for driving, e.g., an actuator 23 to perform auto focussing/tracking.

The addition signal 18 is inputted to a binarizing circuit 24 to binarize it into a binary signal 25 which is applied to a PLL circuit to generate clocks 27. On the other hand, the subtraction signal 19 is inputted to another binarizing circuit 35 to binarize it into a binary signal 36 representative of the read data. The binary signal 36 is demodulated into a read data or reproduced data 38 by a data demodulation circuit 37 to which the clocks from the PLL circuit 40 are supplied. The read data 38 are supplied to the read/write control system 43 for control of the overall system. The read data 38 may be outputted, if necessary, from the read/write control system 43 to the external circuitry. The apparatus is provided, as its characteristic circuit portions, with a clock switching circuit 30, write clock adjustment circuit 28 and timing shift detection circuit 42 to all of which the clocks 27 from the PLL circuit 40 are supplied. The timing shift detection circuit 42 is supplied with the binary signal 36 from the binarizing circuit 35 and with a test pattern 301 from the read/write control system 43 to be later detailed, for generation of a shift from the read data 36 with respect to time.

The write clock adjustment circuit 28 is supplied with a shift signal from the timing shift detection circuit 42. The clocks 27 are adjusted based on the shift signal and outputted to the clock switching circuit 30 as write data clocks 29.

The clock switching circuit 30 outputs to the data modulation circuit 41 either the clocks 27 without adjustment or the write data clocks 29 in accordance with a switching signal 30A from the read/write control system 43. Upon reception of either the clocks 27 or the write data clocks 29, the data modulation circuit 41 receives either write data 32 or the test pattern 301 from the read/write control system 43 which is modulated by the corresponding clocks and outputted as the modulated data 34 to the magnetic head drive circuit 10.

The manner the apparatus constructed as above operates at the timings during data writing and at the timings during forming magnetic domains on the magnetooptical disk 1 will be described.

The timing chart of signals used for explaining the characteristic function of this invention is shown in FIG. 3. In the figure, a specific test pattern for detecting a write timing shift is written at the leading portion 307 of a data write area 306 and 307 on the track 120 formed with pre-pits 110. This test pattern write operation is achieved by outputting a test pattern signal 301 from the read/write control system 43 to the data modulation circuit 41, outputting the normal clocks 27 upon reception of a switching signal 30A by the clock switching circuit 30, and outputting as the modulated data 34 the test pattern signal 301 modulated at the timings of the clocks 27.

With the above operation, magnetic domains 302 are formed on the track of the magnetooptical disk 1. When the record area comes again after further rotation of the disk 1, a data write gate signal 4A is outputted from the read/write control system 43 to the laser drive circuit 4 to apply a light beam spot 140 at a low power and to read or reproduce the written test pattern. The read signal 303 is binarized by the binarizing circuit 35 to obtain a binary signal 36 as a read signal 304. The signal 304 is applied to the timing shift detection circuit 42 to compare it with the original test pattern 301 from the read/write control system 43 and obtain a shift signal 305 representative of a shift between two test pattern signals with respect to time. In this example shown in FIG. 3, the read-out test pattern 304 advances by Δ4 from the written test pattern. The shift signal 305 is supplied to the write clock adjustment circuit 28 to adjust the normal clocks 27 used at the time of writing test pattern and obtain data write clocks 29 which lag by Δ4 relative to the clocks 27.

Upon generation of the data write clocks 29 for the particular data write area (307 and 306), when the data write area again comes after further rotation of the disk 1, the light beam spot 140 is illuminated at a high power for writing data, and the write data clocks 29 selected by the clock switching circuit 30 upon reception of a switching signal 30A are supplied to the data modulation circuit 41. Under this condition, the necessary write data 32 are outputted to the data modulation circuit 41 to modulate the data at the timings of the write data clocks 29 and obtain the modulated data 34 which are written at the positions where the timing shift in forming magnetic domains can be compensated. In reading the written data 32, the normal clocks 27 without adjustment are supplied from the clock switching circuit 30 to cancel out the shift (advance by Δ4) of the data write timings, thus demodulating the written data at correct timings.

With the above method, it becomes possible to compensate for the data write timing shift, and use the Non Return to Zero (NRZ) modulation without self-clock characteristic as the data modulation method. However, in this connection, the frequency of detecting data write timing shifts during one rotation of the disk depends on the degree of change in sensitivity and magnetic field variations during disk one rotation. In view of this, for a conventional disk, it suffices if the specific test pattern writing and the data write timing shift detection are conducted once for each sector separating written data areas.

For the case where data are written in single writing operation on a plurality of sectors, the data write clocks obtained with respect to only the leading sector among the plurality of sectors may be used for writing all the data so long as the data write timing variation is permissible for such a time period.

Next, the data write operation procedure will be described with reference to the flow chart shown in FIG. 4, with the main attention to the operation of the read/write control system 43.

The read/write control system 43 controls the rotation drive system (not shown) and automatic focussing/tracking system 26 in accordance with a known method to access a target track (step 400). During further rotation of the disk, a light beam spot is tracked to a target sector (step 405). When the target track comes, a test pattern 301 is modulated at the timing of the clocks 27 without adjustment to write the test pattern 301 at the laser spot level for data writing (step 410). Thereafter, the operation procedure waits again for the target sector during further rotation of the disk (step 415). When the target sector comes, the test pattern is read at the timings of the clocks 27 without adjustment by using a laser beam spot at the level for data reading (step 420). Using the read-out test pattern 304, and outputted detection command 28A and original test pattern 301, the timing shift is detected and the adjustment amount is determined (step 430). When the target sector comes again after further rotation of the disk (step 430), the data write clocks 29 are selected upon a switching signal 30A, and the write data 32 are outputted to write the data 32 by using a laser beam spot at the level for data writing (step 435). It may possible, if necessary, to wait for the target sector during further rotation of the disk (step 440), and verify the written data at the timings of the clocks without adjustment by using a laser beam spot at the level for data reading (step 445).

The detailed circuit blocks of the timing shift detection circuit 42 for waveshaping the signals shown in the timing chart of FIG. 3 and of the write clock adjustment circuit 28 are shown in FIG. 5. In the figure, the timing shift detection circuit 42 has a serial/parallel converter 415 which serial/parallel converts a test pattern 301 inputted from the read/write control system 43 at the timings of the clocks 27 supplied from the PLL circuit 40 and outputs the converted result to an R-S type flip-flop (R-S FF) 414. The R-S FF 414 is supplied with the test pattern binary signal 304 and outputs the data write timing shift signal 305. The signal 305 is supplied to a pulse width counter 413 to which clocks from a pulse width count clock 405 are supplied. The counted value is supplied to an averaging block 412 which operates, upon reception of a detection command 28A from the read/write control system 43, to average the count value to eliminate the variation of values. The averaged value is outputted to the data write clock adjustment circuit 28 as the data write timing shift signal 305.

A selector 411 of the data write clock adjustment circuit 28 is supplied with the clocks 27 without adjustment via a delay element 410 to thus select and generate the data write clocks 29 in accordance with the data write timing shift signal.

Another circuit arrangement of the timing shift detection circuit 42 and data write clock adjustment circuit 28 shown in FIG. 6 will be described with reference to the timing chart shown in FIG. 7.

In the circuit arrangement shown, the test pattern signal 301 is arranged to be generated within the read/write control system 43 having a test pattern generator constructed of three D-FFs 401, 403 and 404, AND gate 402 and two inverters 421 and 422. The test pattern signal 301 is generated using a pre-pit signal 25 and the data read clocks 27 supplied thereto.

The pre-pit signal 25 inputted to the inverter 421 is supplied to D-FF 401 to generate therefrom a signal 501 in response to a reset signal 412 and "1" signal supplied to "D" terminal. The AND gate 402 receives the signal 501 and data read clocks 27 and outputs the logical-AND as a signal 502. The test pattern in this embodiment is arranged to have four magnetic domains between pre-pits as shown in FIG. 3, so that the signal 502 is divided by 4 at D-FFs 403 and 404 to generate a test pattern signal 503 which is outputted via an inverter 422 to the timing shift detection circuit 42.

In the timing shift detection circuit 42, a counter 405 counts up, upon reception of the signal 503, clocks from a clock generator 406. The frequency of the clocks generated by the clock generator 406 and counted up by the counter 405 is sufficiently higher than the data write and read clocks 27 and 28 to thus allow high resolution. The timing shift detection circuit 42 is supplied with the binary signal 304 representative of the readout test pattern. The output of the counter 405 is latched by a latch circuit 407 in response to the signal 304, the latched signal being stored in a memory 408. A plurality of values stored in the memory 408 are averaged at CPU 409 to eliminate the variation of values caused by various operation conditions.

The data write timing shift signal 305 thus obtained is supplied to the data write clock adjustment circuit 28. In the data write clock adjustment circuit 28, a selector 411 is supplied with the read clocks 27 via a delay circuit 410 to select and generate the data write clocks 29 in accordance with the data write timing shift signal 305.

The selector 411 selects the clocks by which the phases of data write clocks can be adjusted by the shift amount between the application timings of data write magnetic fields and the generation timings of magnetic domains, i.e., by the shift amount of data writing timings. For example, in case of an advance by $\Delta t$ in writing, the clocks whose phases are lagged by an amount nearest the $\Delta t$ from the data read clocks 27 are selected and used as the data write clocks 29. The data write clock adjustment circuit 28 holds the clocks after adjustment during data writing, and changes the clocks when a data write timing shift is detected at the following data writing operation. As above, the data write timing shift is adjusted immediately before writing data to thus allow correct data read/write operation. In the above embodiment, the data write clocks 29 have been generated by adjusting the phases of the clocks from the PLL circuit. However, the clocks may be generated by adjusting the phases of the timing signal obtained by dividing the clocks from the PLL circuit.

Further, the test pattern and the write data may be supplied, if necessary, from the external to the read/write control system 43.

Next, another embodiment of a magnetooptical disk recording apparatus of a two-beam type embodying the present invention will be described with reference to FIGS. 8 to 11.

In the apparatus shown in FIG. 8, two write and read beams are provided for enabling a READ AFTER WRITE operation. The read beam is disposed just after the write beam in the direction of data writing. A magnetic head 5 for supply of modulated data is disposed at the surface of the magnetooptical disk 1 opposite to the write beam side.

A write beam of wavelength of $\lambda_1$ emitted from a semiconductor laser 54 capable of radiating two beams is guided along an optical path shown by a solid line. That is, the write beam is first made parallel by a collimating lens 53, passes via a halfwave plate 52 through a beam splitter 47, reflected upward orthogonally by a mirror 8, and focussed onto the magnetic film of the disk 1 by a focussing lens 9 as a fine spot having a diameter of about 1 micron. The spot is applied at a high power during data writing, and at a low power other than the data writing. The operation during data writing is as follows. The write beam reflected from the disk 1 passes again the focussing mirror 9, reflected by a rectangular prism 46 after passing through a mirror 8, beam splitter 47, and wave separation filter 48, and applied to a light detector 56 after passing through a convex lens 51. The wave separation filter 48 passes the read beam with a wavelength of $\lambda_2$ and reflects the write beam with a wavelength of $\lambda_1$. In accordance with an output from the light detector 56, the light beam power during data writing is monitored and the data write clocks are read. The operation of reading the data write clocks will be described later. On the other hand, the read beam with a wavelength of $\lambda_2$ is guided along the optical path indicated by a broken line. That is, when the read beam reaches the wave separation filter 48 by passing through the similar optical path as of the write beam, it passes therethrough, is reflected by a mirror 55 after passing a halfwave plate 49 and convex lens 50, and applied to a light detector 59 via a detection prism 58. In accordance with an output from the light detector, an out-of-focus signal, tracking error signal and magnetooptical signal are derived. The structure of the detection prism 58 and light detector 59 is not directly related to the present invention so that the detail thereof is omitted. Conventional devices may be used for the prism 58 and detector 59.

An output from the light detector 59 is supplied to a signal separation system 60 which generates a data read clock signal 24A and read-out data signal 25A which are in turn supplied to binarizing circuits 24 and 25', respectively, to generate a data read binary clock signal 24' and read-out data binary signal 36. The data read binary clock signal 24' is transformed by a PLL circuit 40B into data read clocks 27B which are supplied to a timing shift detection circuit 42 and data demodulation circuit 37. The read-out data binary signal 36 is supplied also to the timing shift detection circuit 42 and data demodulation circuit 37.

On the other hand, an output from the light detector 56 is binarized by a binarizing circuit 57 and transformed by a PLL circuit 40A into data write clocks 27A which are supplied to a data write clock adjustment circuit 28 and clock switching circuit 30. The embodiment thus constructed uses both the write beam $\lambda_1$ and read beam $\lambda_2$ so that two types of data write clocks 27A and data read clocks 27B are used. However, the operation is essentially the same as that of the embodiment shown in FIG. 2. Thus, signal processing by a read/write control system 43 of the timing shift detection circuit 42, data write clock adjustment circuit 28, clock switching circuit 30, and data modulation circuit 41 is performed in the same manner as of the embodiment shown in FIG. 2.

The characteristic operating procedure of this embodiment using two write and read beams will be described with reference to the flow chart shown in FIG. 9. The read/write control system 43 controls the disk rotation drive system (not shown) and seeks a target track using the read beam $\lambda_2$ upon output of a gate signal 4A to a laser drive circuit 4 (step 900), and searches a target sector during further rotation of the disk (step 905). When the target sector comes, a test pattern 301 is outputted to the data modulation circuit 41, and the data write clocks 42 without adjustment are selected by the clock switching circuit 30, to thus write the test pattern at the leading portion of the target sector using the write beam $\lambda_1$ (step 910). Following the write operation of the test pattern 301, a READ AFTER WRITE operation is performed wherein the just written test pattern 301 is read using the read beam $\lambda_2$ positioned behind the write beam $\lambda_1$ in response to the data read clocks 43 (step 915). After obtaining a read signal 304 from the written test pattern 301, the signal 304 is processed at the timing shift detection circuit 42 and data write clock adjustment circuit 28 to obtain a timing shift amount and determine a data write clock adjustment amount Δ4 (step 920). Upon determination of the adjustment amount, the read/write control system 43 supplies a switching signal 30A to the clock switching circuit 30 to select the adjusted data read clocks which together with write data 32 are supplied to the data modulation circuit 41. The data 32 are written by using the magnetic head 5 through application of the write beam $\lambda_1$ to the disk (step 925). Thereafter, if necessary, the written data may be verified by positively utilizing the characteristic feature of the two beam method (step 930). The format of a track and the timing chart illustrating the above-described read/write operation are shown in FIG. 10. The record area a of the sector except the sector head is divided into a test area b and a data area c, and a test pattern is written at a leading portion of the test area b. Simultaneously therewith, a RAW (Read After Write) operation is performed during a period e following a period d by using the read beam to read the test pattern, and the adjustment amount is determined before the start point of the data area c. Writing data starts at the start point of the data area c, and the data are verified during a following period f.

According to the data writing by the procedure shown in the flow chart of FIG. 9, the test area b of the record area a shown in FIG. 10 becomes waistful with respect to writing data. However, time required for writing data can be economized by positively utilizing the characteristic feature of the READ AFTER WRITE operation.

In order to use the data write area economically rather than to allow time loss more or less, as shown in the flow chart of FIG. 11, after a step 1120 where the timing shift and the adjustment amount are determined, a step 1125 is added where the start position of a target sector is waited during further rotation of the disk so that the area of the track can be used without loss with respect to writing data. The other steps of the flow chart shown in FIG. 11 are the same as of the flow chart of FIG. 9, so the description therefore is omitted.

In the embodiments of the magnetooptical disk recording apparatus of one beam and two-beam types, although the magnetic modulation method which particularly poses a problem of the timing shift in forming magnetic domains has been used by way of example, the optic modulation method may also be applied to eliminate a deviation between data write and read timings.

Further, in the above embodiments, a pre-format shown in FIG. 3 has been used. However, the present invention is also applicable to other pre-formats shown, for example, in FIG. 2 of "Formats for 5¼" optical disk system", The Society of Photo-Optical Instrumentation Engineers, Vol. 695, Optical Mass Storage II, 1986, pp. 239 to 242. In this case, data are written between sample zones, and a track shift signal is detected from the sample zone by using the same principle as of the present embodiments.

According to the present invention, in a recording method for a magnetooptical disk having pits previously formed on a record track which pits are optically detectable to generate data read/write clocks, the data read clocks are adjusted in accordance with a shift between application timings of recording magnetic fields and generation timings of magnetic domains. Therefore, even if the data write timing shift is present, the phases of data write clocks can be adjusted so that a correct data read/write operation can be carried out without influence of a timing shift. Further, various types of data modulation methods can be used irrespective of their self-clock characteristics. Furthermore, since such adjustment is performed at the time of data writing, data are prevented from being written in an undesirable area near a pre-pit.

What is claimed is:

1. A method of recording a signal in a magneto-optical disk having pre-pits formed on a recording track which pits are optically detectable and are read out for enabling generation of data read clocks and data write clocks and wherein means including light beam means and magnetic field generating means are provided for recording or writing data onto said magnetooptical disk or reading data therefrom, comprising the steps of:

prior to writing data in said magnetooptical disk, writing a test pattern in accordance with a test pattern signal to form a magnetized domain in a leading portion of a data recording area of said magnetooptical disk in accordance with predetermined data write timings;

reading said test pattern by reading said leading portion of said data recording area to generate a reproduced signal of said magnetized domain;

detecting a time shift between said reproduced signal of said magnetized domain and said test pattern signal;

adjusting said data write timings in accordance with said time shift; and recording data in said data recording area in accordance with said adjusted data write timings.

2. A method according to claim 1, wherein said asjusted data write timings are data write clocks.

3. A method according to claim 2, wherein said adjusted data write timings are obtained by adjusting data write clocks generated by reading out of pre-pits.

4. A method according to claim 1, wherein said time shift is a shift between said test pattern signal and said reproduced signal of said magnetized domain formed in said magnetooptical disk in correspondence with said test pattern.

5. A method according to claim 1, wherein said light beam means includes means for providing a laser light pulse and means for changing the intensity of the laser light pulse, and said step of writing said test pattern and said step of recording data are performed by changing the intensity of the laser light pulse in accordance with said test pattern and data, respectively.

6. A method according to claim 1, wherein said magnetic field generating means includes drive means for changing a direction of a generated magnetic field and said step of writing said test pattern and said step of recording data are performed by changing the direction of the generated magnetic field in accordance with said test pattern and data, respectively.

7. A method according to claim 1, wherein said writing of said test pattern is performed by predetermined units of a sector assigned on said magnetooptical disk.

8. A method according to claim 1, wherein said reading of said test pattern is performed, after writing of said test pattern, after one rotation of said magnetooptical disk by using a light beam which is used for writing said test pattern and which is emitted from said light beam means.

9. A method according to claim 1, wherein said writing of said test pattern is performed using a light beam emitted from said light beam means and sequentially thereafter, reading said test pattern is performed using a different light beam emitted from said light beam means.

10. A method according to claim 1, wherein said writing of said test pattern is performed using a light beam emitted from said light beam means, and after one rotation of said magnetooptical disk reading said test pattern is performed using the same light beam.

11. A recording apparatus, for magnetooptical disk formed with pre-pits, for reading/writing data in accordance with a predetermined pre-pit clock signal based upon reading out said pre-pits using a magnetic head and light beam head constituting read-write means, comprising:

time shift detection means for receiving a predetermined test pattern signal in synchronism with predetermined clocks and a read-out signal of a test pattern written in said magnetooptical disk according to said test pattern signal, and detecting a time shift therebetween;

clock adjustment means for adjusting said predetermined clocks in accordance with said detected time shift detected by said timing shift detection means to generate adjusted clocks;

clock switching means for receiving said predetermined clocks and said adjusted clocks, and selectively outputting ones of said predetermined clocks and said adjusted clocks upon reception of a predetermined switching signal;

data modulation means for receiving one of said predetermined test pattern signal and write data, modulating said received one at the timings of ones of either one of said predetermined clocks and said adjusted clocks inputted from said clock switching means, and outputting said modulated received one to said read-write means; and control means for generating said predetermined clocks and adapted to operate such that in writing said test pattern in said magnetooptical disk, said predetermined test pattern signal is outputted to said data modulation means, and said predetermined switching signal is outputted to said clock switching means to supply said predetermined clocks to said data modulation means, in reading said test pattern written in said magnetooptical disk, a read-out signal of said test pattern is outputted to said timing shift detection means, and in writing data, said predetermined switching signal is outputted to said clock switching means to output said adjusted clocks to said data modulation means to which said write data are also outputted.

12. A recording apparatus according to claim 11, wherein said magnetic head enables writing of said test pattern and said data.

13. A recording apparatus according to claim 12, wherein said light beam head provides a write light beam for writing in cooperation with said magnetic head and a read light beam for reading, said timing shift detection means includes means for detection of the test pattern and the pre-pits from the disk in response to reflection of said read beam, and said clock adjustment means adjusts write clocks in accordance with a signal generated from reflection of said write beam, and said clock switching means selectively outputs ones of read clocks generated from reflection of said read beam and said adjusted clocks.

14. A recording apparatus according to claim 11, wherein said light beam head enables reading of said test pattern and said data.

15. A recording apparatus according to claim 14, wherein said light beam head is constructed so as to emit one beam.

16. A recording apparatus according to claim 11, wherein said predetermined test pattern signal is generated within said control means by dividing a logical-AND of said predetermined pre-pit clock signal and said predetermined clocks.

17. A recording apparatus according to claim 11, wherein said clock adjustment means generates said adjusted clocks by adjusting the phases of said predetermined clocks.

18. A recording apparatus according to claim 11, wherein said clock adjustment means generates said adjusted clocks by dividing said predetermined clocks.

* * * * *